United States Patent [19]
Hladik

[11] 3,884,662
[45] May 20, 1975

[54] AIR FILTER AND SUPPORT FRAME

[76] Inventor: Stephen M. Hladik, Belmont Village, Apt. 31-B, Liverpool, N.Y. 13088

[22] Filed: Sept. 17, 1973

[21] Appl. No.: 397,935

Related U.S. Application Data

[63] Continuation-in-part of Ser. No. 248,424, April 28, 1972, abandoned.

[52] U.S. Cl. .................... 55/484; 55/478; 55/487; 55/502
[51] Int. Cl. ............................................. B01d 27/08
[58] Field of Search ............ 55/484, 497, 499, 500, 55/502, 483, 481, 521, 4.93, 487, DIG. 12, DIG. 31, 478; 52/172; 49/320

[56] References Cited
UNITED STATES PATENTS

| | | | |
|---|---|---|---|
| 1,771,173 | 7/1930 | Greene | 55/DIG. 31 |
| 1,898,424 | 2/1933 | Collins | 55/DIG. 31 |
| 2,067,654 | 1/1937 | Axe | 52/172 |
| 2,252,724 | 8/1941 | Myers | 55/DIG. 31 |
| 3,247,652 | 4/1966 | Annas et al. | 55/484 |
| 3,423,908 | 1/1969 | Hant | 55/481 |
| 3,755,995 | 9/1973 | Stickel | 55/DIG. 31 |

OTHER PUBLICATIONS
Cambridge Sidelock, Bulletin 105 A, Cambridge Filter Corp., Syracuse, N.Y., dated 5/72, pp. 1–5.
Cambridge Side-Flo & Side-Cap, Bulletin 180C, Cambridge Filter Corp., dated 7/67, pp. 1–8.

*Primary Examiner*—Bernard Nozick
*Attorney, Agent, or Firm*—Charles S. McGuire

[57] ABSTRACT

A support frame for a bank of air filter units which allows fast and convenient removal and replacement of individual cartridges. The frame comprises a plurality of horizontally disposed channel members divided into two adjacent tracks for accepting in superposed relation a layer of pre-filter media and high efficiency filter cartridges. Vertical supports at the ends also have inwardly facing channels to engage the outer edges of the pre-filter media and the outside cartridges. Resilient gasket means of sponge rubber, foam plastic, felt, or the like, are provided within at least the channels for the high efficiency filters to form a seal at the top, bottom, and outer edges, with similar gaskets on the individual filter cartridges forming seals along the abutting edges thereof. Resilient means urging the abutting edges into sealing engagement are manually releasable to allow easy withdrawal and insertion of individual cartridges from the front of the frame.

12 Claims, 9 Drawing Figures

AIR FILTER AND SUPPORT FRAME

REFERENCE TO RELATED APPLICATION

This is a continuation-in-part of application Ser. No. 248,424, filed Apr. 28, 1972, of the same inventor, now abandoned.

BACKGROUND OF THE INVENTION

This invention relates to frames for supporting a bank of air filter elements and, more particularly, to a novel support frame allowing more efficient removal and replacement of individual filter cartridges.

It is a common practice to fabricate air filter cartridges in standard sizes and to construct support frames for accommodating a plurality of such cartridges to form, in effect, a wall or bank of some desired size. Air passing from one side or the filter bank to the other must pass through the filter elements, thereby removing particles or other contaminants. Frequently, a double bank of filter elements is provided for more efficient filtering. That is, a bank of pre-filters, or low efficiency filter elements, is superposed with a bank of high efficiency filter cartridges so that air must pass through both in traveling from one side to the other of the filter bank.

The pre-filter material may be supplied in continuous roll form, or as individual, rectangular cartridges of the same peripheral dimensions as the high efficiency filter cartridges. A metal frame is constructed to provide horizontal and vertical supports in the required number and spacing for the desired area of the filter bank. In order to prevent air leakage around the cartridges, or between the cartridges and the frame, sealing means are provided along with retaining means for securely fastening the cartridges in sealing contact with the frame. Such securing means are commonly provided in the form of spring clip retainers, manually insertable and removable to cooperatively engage the support frame and filter cartridge to maintain the two in close engagement.

Conventional frame construction is such that filter cartridges may be removed and replaced from one side of the frame only; that is, if a high efficiency cartridge is to be replaced, the adjacent low efficiency filter cartridge must first be removed to allow access thereto. This is likely to involve removal and replacement of several spring clip retainers, or other such fastening means. The structural elements of the support frame are commonly held together with rivets.

SUMMARY OF THE INVENTION

It is a principal object of the present invention to provide a support frame structure for holding a bank of air filter elements in a manner which allows fast and convenient removal and replacement of individual elements.

A further object is to provide an air filter support frame of simple and economical construction capable of holding a plurality of filter cartridges in sealing engagement without springs, clips, or other such separate retaining elements.

Another object is to provide a bank of air filter cartridges and cooperating support frame wherein a seal is provided along the top, bottom and sides of each cartridge, and removal or replacement of any cartridge may be effected merely by lifting and inserting the cartridge without handling any other elements.

A still further object is to provide a bank of filter cartridges resiliently biased into sealing engagement along abutting side edges with means allowing easy removal and replacement of individual cartridges from either the front or rear of the filter bank.

Briefly, the foregoing objects are accomplished by constructing the support frame of horizontal channel members into which the top and bottom edges of each filter cartridge are inserted. Vertically disposed channel members are provided at the ends, spaced apart sufficiently to accommodate the desired number of filter cartridges therebetween in abutting relation. Resilient gasket means are provided within each horizontal and vertical channel, as well as along the side edges of the individual cartridges to prevent leakage of unfiltered air in appreciable quantity. The horizontal channel members have a central divider forming a pair of tracks so that cartridges or other filter elements of two types (e.g., a pre-filter and a high efficiency filter) may be held by the frame in superposed relation. The horizontal members and dividers may be spot welded to one another, or formed as unitary elements by extrusion, and bolted to the vertical members, eliminating the rivets commonly used to fasten together elements of prior air filter support frames.

In another embodiment, the horizontal channels are formed in a somewhat different configuration and gaskets are provided only in those portions of the channels holding the high efficiency filter cartridges. Also, means are provided for relieving the resilient force urging these cartridges into tightly engaged contact of the adjoining side edges to allow individual elements to be easily removed and replaced.

DESCRIPTION OF THE PREFERRED EMBODIMENTS

Figure 1:
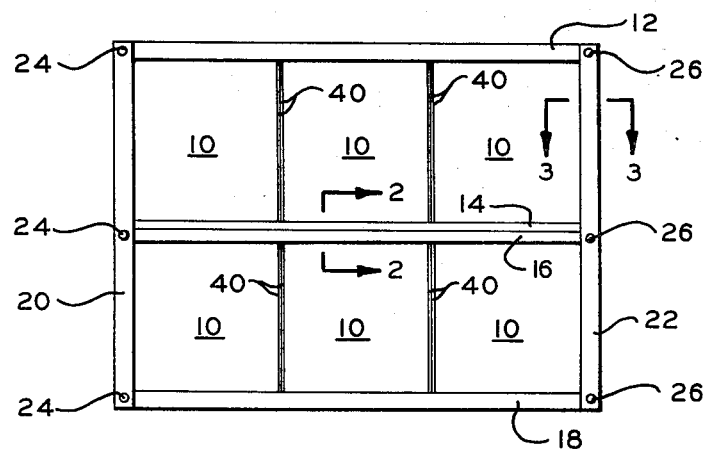
FIG. 1 is a front elevational view of a bank of filters and support frame constructed according to one embodiment of the present invention.

Referring to the drawing, FIG. 1 shows a plurality air filter cartridges 10 arranged in two horizontal rows of three cartridges each, and supported in closely abutting relation by a rigid frame. Constructional details of cartridges 10 are not shown, many conventional air filter units comprising a layer of filter media held in a substantially rectangular frame being suitable for employment in the invention. In fact, a continuous strip of filter material may be used in place of the three cartridges in each row, if desired, as will appear more fully hereinafter. The frame is shown in FIG. 1 as seen from the upstream side, cartridges 10 being of the prefilter type adapted to remove larger particles from the air with a bank of high efficiency filters, positioned directly behind cartridges 10, removing the fine particles.

The top and bottom edges of the upper row of cartridges 10 are held in horizontally disposed channel members 12 and 14, respectively. The top and bottom edges of the lower row of cartridges 10 are held in horizontal channel members 16 and 18, respectively. The outermost side edges of the end cartridges in each row are held in vertically disposed channel members 20 and 22. Horizontal members 12, 16 and 18 are affixed to vertical member 20 by bolts 24, which extend throughout holes in the channel members and are secured by nuts on the opposite side. Likewise, bolts 26 secure the same horizontal members to vertical member 22.

Figure 2:
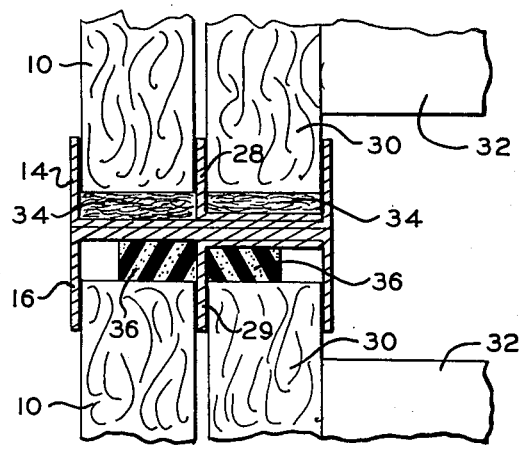
FIG. 2 is a sectional view taken on line 2—2 of FIG. 1.

Referring now to FIG. 2, channel member 14 is divided into side-by-side tracks by angle member 28 which is spot welded to the channel member with one edge extending parallel to, in the same plane as, and substantially midway of the edges of the channel member. Angle member 29 is similarly affixed to channel member 16, and angle members (not shown) are also provided to divide channel members 12 and 18 into two adjacent tracks. Channel members 14 and 16 are spot welded to one another in back to back relation.

Figure 3:
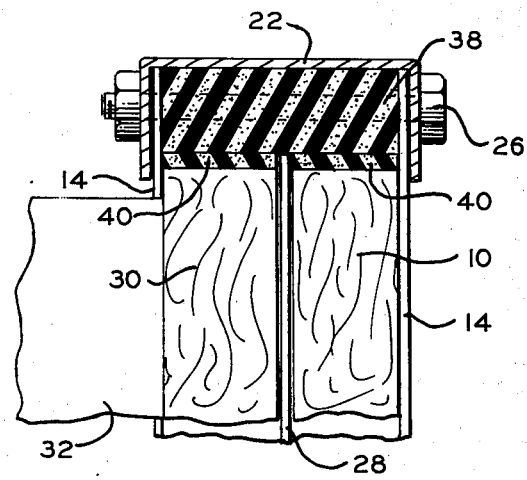
FIG. 3 is a sectional view taken on line 3—3 of FIG. 1.

Filter cartridges 10 are inserted in the upper and lower tracks on one side of the channel members, and filter cartridges 30 are inserted in the adjacent set of tracks. Cartridges 10 contain filter media intended to perform only a coarse of prefiltering function. Cartridges 30 are of a higher efficiency and may be, for example, of the extended area type such as that shown in U.S. Pat. No. 3,190,059. Such filter units include a plurality of pockets extending in the direction of air flow, a fragment 32 of such a pocket being shown in FIGS. 2 and 3.

Extending along the entire length of the two tracks in channel member 14 are resilient gaskets 34. Likewise affixed within the tracks of channel member 16 are resilient gaskets 36. Gasket 38 is affixed within vertical channel member 22, and a similar gasket is provided in vertical channel 20. Resilient gaskets 40 are secured along the side edges of all cartridges.

Cartridges are inserted in the tracks by inserting the top edge of the cartridge in the upper track far enough so that the lower edge of the cartridge will pass over the upstanding edge of the channel member for insertion in the lower track. The gasket meterial in the upper track is compressed as the cartridge is inserted over the lower channel member, but the relative dimensions and resiliency of the gasket material is such that the gasket fills the space between the cartridge and channel, forming an effective seal, when the cartridge is in place. Cartridges are removed, of course, by reverse procedure, lifting up and removing the lower edge first.

The gaskets may be of any suitable, resiliently deformable material such as sponge rubber, urethane foam, felt, and the like. Although felt is not resilient enough to be used as the gasket material in the upper tracks or side channels, it is preferred over the more resilient materials for use in the lower tracks. This is because the weight of the cartridges is on the lower track gaskets and the more resilient materials tend to tear or separate from the channel members more easily as the filter cartridges are moved laterally.

Figure 4:
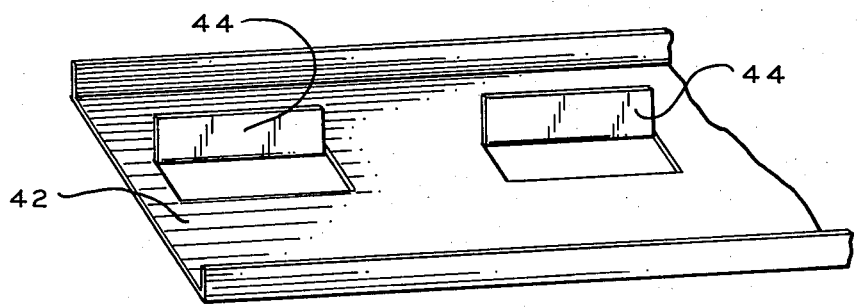
FIG. 4 is a fragmentary, perspective view showing an alternate construction of one of the elements.

In FIG. 4 is shown a modified version of horizontal channel member 42. Rather than providing the adjacent tracks with a central divider formed by a separate angle member, three-sided cuts are made at intervals along the channel member and bent up to form tabs 44. Two such channel members are welded in back-to-back relation to provide an intermediate horizontal member having both upwardly and downwardly facing tracks. Gaskets are provided and cartridges inserted in the same manner as in the previous embodiment.

Figure 5:
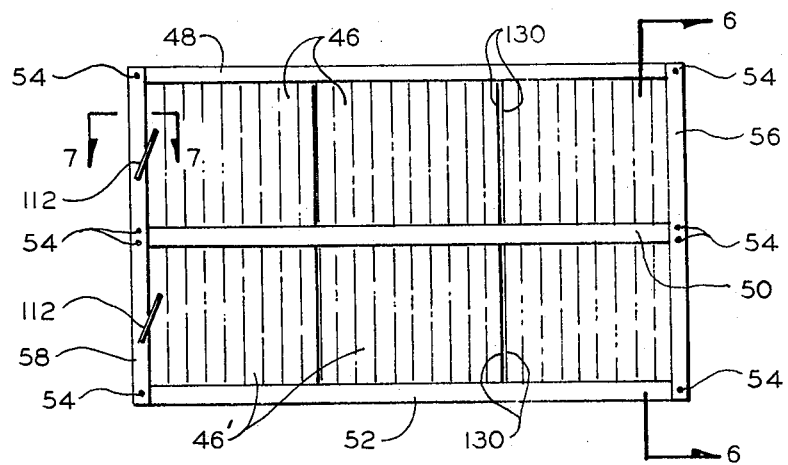
FIG. 5 is a front elevational view of a bank of filter elements and support frame constructed according to another embodiment.

Referring now to FIGS. 5–9, another construction of the frame support means is shown, the pre-filter material and high efficiency filter cartridges being the same as in the previously described embodiment. The frame is shown in FIG. 5 as seen from the downstream side, cartridges 46 in the upper row and 46' in the lower row being of the high efficiency type. The frame is comprised of horizontally disposed upper, intermediate and lower tracks, 48, 50 and 52, respectively, secured by self-threading screws 54 to vertical side channels 56 and 58. The frame may be of any desired horizontal length and suitable vertical intermediate supports (not shown) may be provided as required for sections exceeding, for example, 8 or 10 feet.

Figure 6:
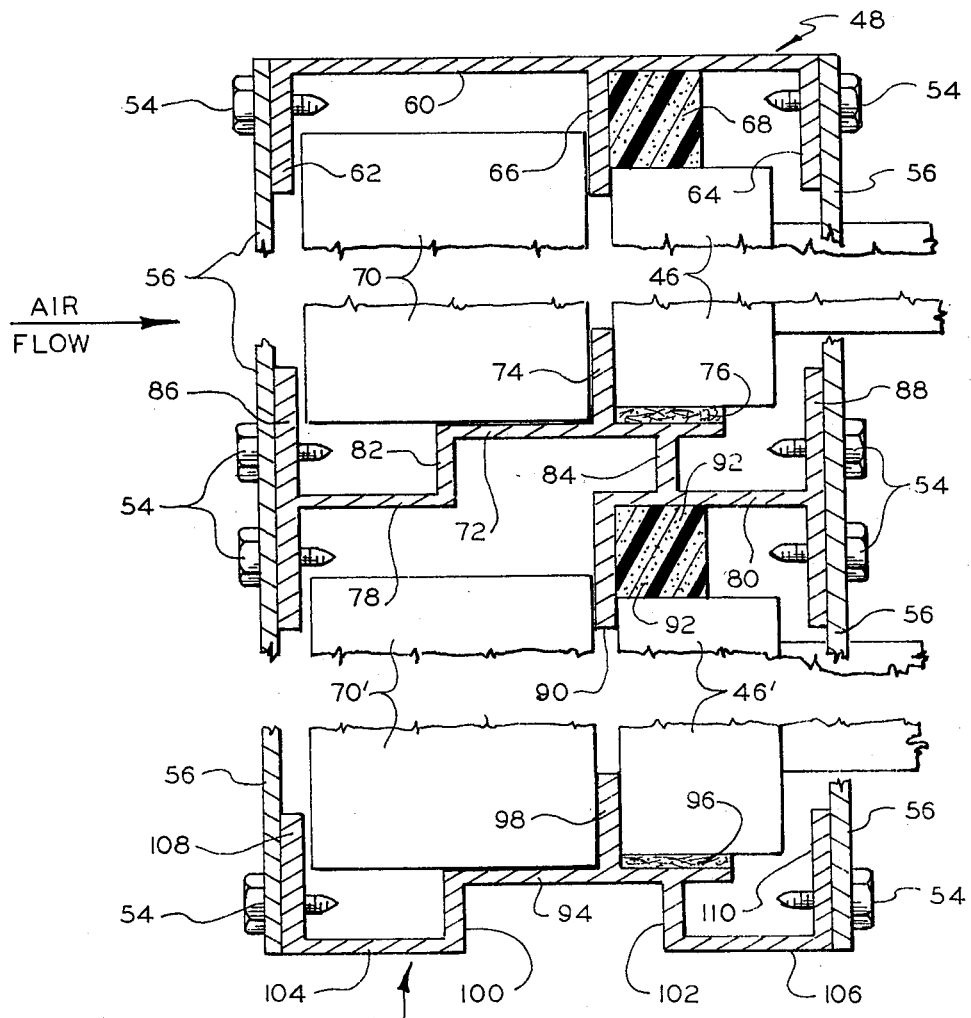
FIG. 6 is a fragmentary sectional view taken on the line 6—6 of FIG. 5.
Figure 7:
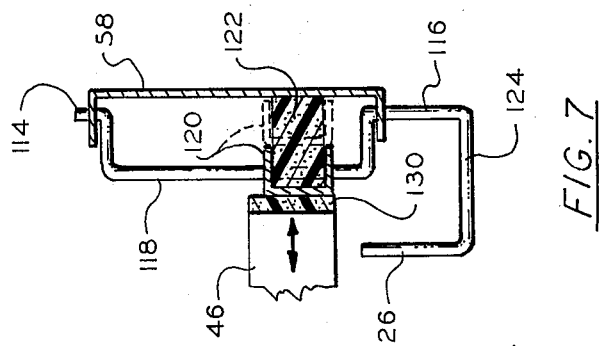
FIG. 7 is a sectional view taken on the line 7—7 of FIG. 5.
Figure 8:
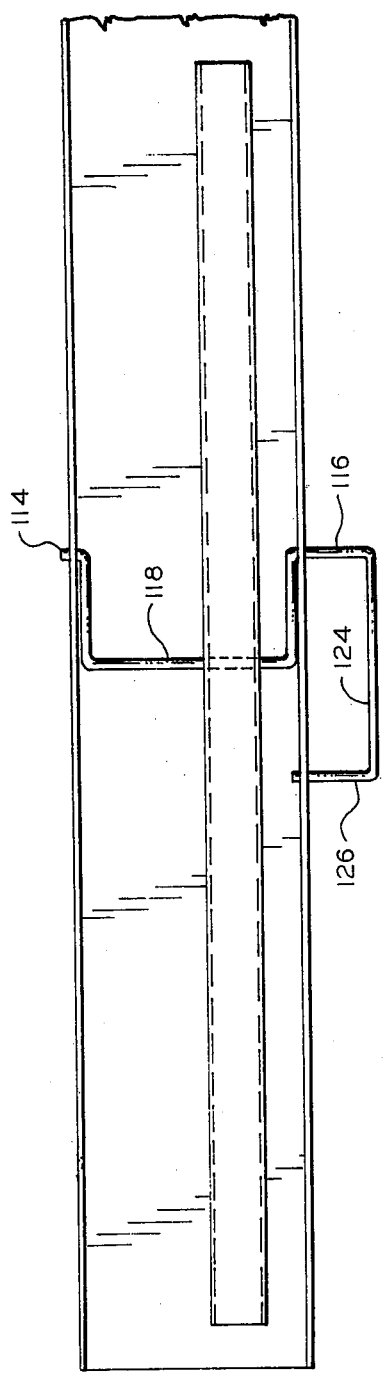
FIG. 8 is a fragmentary side elevational view of the construction of FIG. 5.

Each of tracks 48, 50 and 52 is preferably formed from a length of aluminum extrusion cut to the required dimensions, as are side channels 56 and 58. In FIG. 6, the cross-sectional configuration of each of the tracks is shown. Upper track 48 includes horizontal portion 60, outer vertical portions 62 and 64, and medial divider portion 66. Foam gasket 68 is disposed adjacent divider portion 66 on the downstream side, to engage the upper edge of high efficiency filter cartridge 46, forming a seal to prevent leakage of air over the top edge of the cartridge. The width of gasket 68 is considerably less than the dimension between divide portion 66 and outer vertical portion 64, leaving space to accommodate the end of screw 54 which secures end channel 56 to portion 64. The upper edge of pre-filter cartridge 70 is retained between divider and outer vertical portions 66 and 62, with space being provided above the cartridge for the end of the screw securing channel 56 to outer portion 62.

The cross section of intermediate track 50 is more complex, the outer edges of each of cartridges 46 and 70 resting on horizontal portion 72 with vertical divider portion 74 therebetween. Felt gasket 76 is secured to portion 72 on the downstream side, forming a seal to prevent leakage of air under cartridge 46. Horizontal portions 78 and 80 are vertically offset from horizontal portion 72 by vertical portions 82 and 84, respectively providing space for the ends of the screws securing each side of end channel 56 to the upper sides of outer vertical portions 86 and 88.

Vertical divider 90 extends downwardly from horizontal portion 80, in line with divider 74, separating the upper edges of the lower row of high efficiency filter cartridges 46' and pre-filter cartridges 70'. Foam gasket 92 is provided on the downstream side of divider 90 to prevent leakage over the upper edge of cartridge 46'. The space between the upper edges of cartridges 46' and 70', and horizontal portions 80 and 78, respectively, provides ample room for the ends of screws 54 securing each side of end channel 56 to the lower sides of outer vertical portions 86 and 88.

Lower track 52 includes horizontal portion 94, upon which the lower edges of cartridges 46' and 90' rest, with felt gasket 96 serving as a seal to prevent air leakage under cartridge 46'. Vertical divider 98 separates the cartridges, being vertically aligned with divider 90. Vertical portions 100 and 102 provide a vertical offset for horizontal portions 104 and 106, upon which the frame rests, thereby accommodating the ends of screws 54 by which outer vertical portions 108 and 110 are secured to end channels 56.

The present embodiment also includes means for maintaining the side edges of the high efficiency filter cartridges in tightly abutting engagement, such means being selectively releasable to allow easy removal and replacement of downstream cartridges from either side of the frame. Two levers 112 are shown in FIG. 5 attached to end channel 58, one adjacent each row of filter cartridges 46 and 46'. The structure and operation of these levers and associated elements is shown in more detail in FIGS. 7–9.

Figure 9:
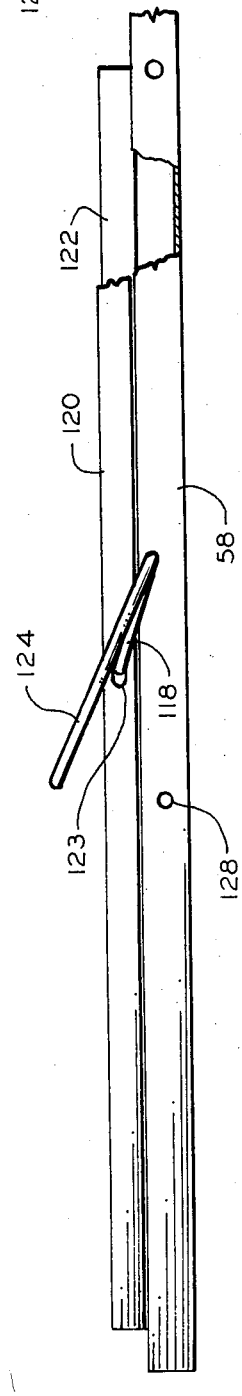
FIG. 9 is a front view of the structure of FIG. 8.

Each lever is pivotally attached to end channel 58 by end portion 114 and portion 116 passing loosely through openings in each side of the end channel. U-shaped crank portion 118, between the pivotal mounting points, passes through openings in filler channel 120 and foam gasket 122, one such opening being shown in FIG. 9, denoted by reference number 123. By manually grasping handle portion 124 and turning the lever about the axis through portions 114 and 116, crank portion 118 rotates to move channel 120 between the positions shown in solid and dotted lines in FIG. 7. The natural resilience of foam gasket 122 allows it to be compressed as filler channel 120 is moved to the inner (dotted) position. In such position, the gasket will exert a biasing force, tending to push the channel outward. The filler channel may be retained in the inner position by deflecting end portion 126 over the edge of end channel 58 and placing it in opening 128 (FIG. 9).

With filler channel 120 retained in the inner position, lateral space is provided for grasping the edges of filter cartridges 46 and 46' to remove them from the frame. When cartridges have been replaced to fill the frame, handle portion 124 is grasped and deflected to move end portion 126 out of opening 128. Lever 112 is allowed to rotate under the biasing force provided by gasket 122 expanding to its natural form, thereby moving the outer face of filler channel 120 against foam gasket 130. All lateral edges of filter cartridges 46 and 46' are provided with gaskets 130, as indicated in FIG. 5. With filler channel 120 in the outer position (solid lines in FIG. 67), all cartridges are firmly engaged and sealed along the lateral edges. The earlier described foam and felt gaskets within the tracks provide seals at the top and bottom edges.

From the foregoing description, it may be seen that the invention provides a support frame for a double walled bank of air filters allowing much easier and faster insertion and withdrawal of individual cartridges. The two walls of filters would normally include a prefilter and a high efficiency filter stage in superposed relation, and cartridges of either type may be withdrawn or installed from either side of the frame. Individual cartridges may be removed after a full set has been installed by moving adjacent cartridges laterally to allow the cartridge to be withdrawn to be manually grasped at the sides, and lifted into the upper channel to allow withdrawal of the lower edge over the lower channel member. The flanges or lips on the channel members forming the lower set of tracks are preferably shorter than those forming the upper tracks since the upper cartridge edges must be inserted farther into the upper tracks, and the lower cartridge edges passed over the lower track lip. The invention further contemplates the use of a single piece extrusion in place of the disclosed channel and angle members, including a single extrusion for intermediate horizontal supports having three lips extending in both directions from the central portion.

While several embodiments of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. An air filter support frame comprising in combination:
    a. a first horizontally disposed support having three parallel, upwardly directed lips, one along each longitudinal edge and one intermediate thereof, to define two adjacent tracks;
    b. a second horizontally disposed support, parallel to and spaced a predetermined distance above said first support and having three parallel, downwardly directed lips, one along each longitudinal edge and one intermediate thereof, to define two adjacent tracks of the same width as the two tracks of said first horizontal support and vertically aligned therewith;
    c. two vertically disposed supports, fixedly attached to said first and second horizontal supports at opposite ends thereof, said vertical supports each having two parallel inwardly directed lips, one along each longitudinal edge, to define a channel of substantially the same width as the combined width of the two tracks of said horizontal members;
    d. a gasket of resilient material affixed within at least one vertically aligned pair of said tracks, extending substantially the entire lengths thereof;
    e. an additional vertically disposed member movably mounted upon one of said pair of vertical supports and extending substantially from one to the other of said horizontal supports; and
    f. means connected to one of said vertically disposed supports for moving said vertical member away from and toward said one vertical support while remaining substantially parallel thereto.

2. The invention according to claim 1 and further including an additional vertically disposed member adjacent one of said pair of vertical supports and extending substantially from one to the other of said horizontal supports, and means for moving said vertical member away from and toward said one vertical support while remaining substantially parallel thereto.

3. The invention according to claim 1 and further including means effecting a seal between said vertical member and said one vertical support.

4. The invention according to claim 3 wherein said seal comprises a strip of compressible material extending the entire length of said vertical member.

5. The invention according to claim 4 wherein said vertical member comprises a U-shaped channel member and said compressible material is disposed between the side wall thereof.

6. The invention according to claim 5 wherein the width of said channel member is less than the width of one of said vertically aligned pair of tracks in said horizontal supports.

7. The invention according to claim 1 and further including means biasing said vertical member toward movement away from said one vertical support.

8. The invention according to claim 7 wherein said means for moving said vertical member comprise a crank arm pivotally connected to both said vertical member and said one vertical support.

9. The invention according to claim 8 wherein said biasing means comprise a continuous strip of compressible material extending the entire length of said vertical member and disposed in sealing engagement between said vertical member and said one vertical support.

10. The invention according to claim 9 and further including detent means for retaining said vertical member in the position closest to said one vertical support, against the force of said biasing means.

11. A bank of air filters and support frame therefor comprising:
  a. an upper horizontal support having a central and two outer, downwardly directed flanges extending the length thereof in parallel relation to define a first pair of adjacent channels;
  b. an intermediate horizontal support having a central and two outer, upwardly directed flanges on the upper side thereof and a central and two outer, downwardly directed flanges on the lower side thereof, each of said flanges extending the length of said intermediate support in parallel relation to define second and third pairs of adjacent channels by said upwardly and downwardly directed flanges, respectively;
  c. a lower horizontal support having a central and two outer, upwardly directed flanges extending the length thereof in parallel relation to define a fourth pair of adjacent channels;
  d. an upper row of rectangular filter cartridges in side-by-side relation having upper edges retained in one of said first pair of tracks and lower edges retained a vertically aligned one of said second pair of channels;
  e. a lower row of rectangular filter cartridges in side-by-side relation having upper edges retained in one of said, third pair of tracks and lower edges retained in a vertically aligned one of said fourth pair of channels;
  f. a first layer of filter media retained in the other tracks of said first and second pairs in juxtaposed relation to said upper row of cartridges;
  g. a second layer of filter media retained in the other tracks of said third and fourth pairs in juxtaposed relation to said lower row of cartridges;
  h. said intermediate horizontal support including a vertical web joining said second and third channels, and separating the horizontal planes thereof by a distance greater than the thickness of the material of said intermediate horizontal support;
  i. a pair of vertical supports to which the ends of said upper, intermediate and lower horizontal supports are attached to hold the latter with the edges of opposing flanges of said first and second pairs, and said third and fourth pairs, of channels spaced by a distance less than the height of the respective rows of said cartridges, the vertical space within opposing channels being greater than said height; and
  j. means effecting a seal at each of the edges of all of said cartridges in said upper and lower rows.

12. The invention according to claim 11 wherein said sealing means along the ton edges of said cartridges comprises a compressible gasket arranged within said one of said first and third pairs of tracks and having an uncompressed position wherein the vertical dimension between the gasket and opposing one of said second and fourth tracks is less than the height of said cartridges.

* * * * *